Patented Mar. 3, 1936

2,033,009

UNITED STATES PATENT OFFICE 2,033,009

YEAST FOOD WITH ALKALINE BIAS

Helman Rosenthal, Dallas, Tex.

No Drawing. Application November 27, 1934,
Serial No. 755,063

2 Claims. (Cl. 99—91)

This invention relates to a yeast food or stimulant designed to be manufactured and sold as an additive substance for a flour batch in the making up of bread dough, the main purpose of which is to control the activity and duration of yeast propagation so as to shorten or otherwise definitely control the time of leavening.

Another object of the invention is to provide a yeast food for the purpose described, and which under certain conditions of humidity would deteriorate through acid decomposition, except for the fact that the invention contemplates the employment of an additional ingredient to keep the yeast food alkaline until used.

Other objects of the invention relate to the effecting of economies, such as saving of yeast, sugar and other ingredients and increasing the absorptive capacity of the flour, and the production of a loaf of bread of finer texture, better color, etc.

In the commercial baking of bread it is essential that the time required for ageing or maturing of the dough be speeded up or conversely, slowed up, or in other words, definitely controlled so as to bring it to the standard degree of maturity within time limits determined by the requirements of the baking plant.

It is customary to add a yeast stimulent to the flour in greater or less quantity at the time of mixing the dough in order to accomplish this result. This yeast stimulant is an article of manufacture consisting of, in the present instance, certain proportions of ammonium chloride, calcium sulphate, and potassium bromate in admixture with a filler, which filler is customarily a large proportion of flour and is provided so that slight inaccuracies in the quantity of yeast food or stimulant used, will be negligible in their effect upon the speed of yeast propagation.

The ingredients of a yeast food as commonly known may be compounded approximately in the following proportions, .64 ounce of ammonium chloride, 1.76 ounces of calcium sulphate, .0176 ounce of potassium bromate, and 2.8 ounces of flour. It will be observed that the flour or filler constitutes more than 50 percent of the entire mixture.

There has been a great demand for a yeast food of substantially greater strength than the above, that is to say, a yeast food in which the relative proportions of the three essential ingredients is approximately maintained, but in which the proportion of filler is substantially reduced. Attempts to commercialize such "double strength" yeast food have not, until the advent of the present invention, been entirely successful since the compound is not stable, but gradually deteriorates in the package. In the course of deterioration, the mixture gradually turns a dark straw color until all of the potassium bromate has disappeared. During this period of decomposition, the containers are attacked, mainly due to the liberation of free bromine, and perhaps some bromic acid. This deterioration has been found to persist even when other oxidizing agents have been substituted for the potassium bromate such as potassium or sodium iodates, or iodates or bromates of other metals.

After the complete disappearance of the oxidizing agent, the material gradually resumes its natural color which in this particular instance is white. By the time this has happened, the value of the yeast food has become almost nil.

It has been determined that this decomposition is started by humidity in the air as well as moisture inherent to the composition itself. It has also been discovered that small amounts of acid promote this decomposition and that greater the acidity the more the deterioration is accelerated.

The present invention therefore consists in the addition of small amounts of an alkaline salt to the yeast food, for the purpose of keeping the mixture alkaline until it reaches the fermentation stage whether in the dough or in the sponge. Although a number of alkaline salts are available for this purpose, I prefer to employ either calcium carbonate or magnesium carbonate, because of their slow solubility.

The amounts of the alkaline salts which it is desirable to add for this purpose, are immaterial except that very large proportions should not be used, as high alkalinity of the mixture has a tendency to retard yeast fermentation. It has been experimentally determined that alkaline salts in so small a proportion as one-tenth of one percent have a useful effect in stabilizing the product, but that approximately two percent of the alkaline salt is the optimum proportion.

An exemplary formula for a yeast food according to the present invention would therefore be 1.28 ounces of ammonium chloride, 3.52 ounces of calcium sulphate, .0352 ounce of potassium bromate, .097 ounce of calcium or magnesium carbonate and 2.8 ounces of flour.

While the addition of the alkaline ingredient is most urgently indicated in connection with those yeast foods of stronger proportions than that first indicated, it is found advantageous even with yeast foods according to known formulas which in general do not keep indefinitely and whose keeping qualities are enhanced by the presence of alkali.

While I have in the above description disclosed what I believe to be a preferred and practical embodiment of my invention, it is to be understood that the proportions as given are merely exemplary and not critical and that the employment of magnesium or calcium salts is merely illustrative of a number of available alkaline compounds.

What I claim is:

1. A yeast concomitant fortified against acidic deterioration, adapted to be used in the making of leavened bread comprising in admixture, the following ingredients in approximately the following proportions: .64 ounce ammonium chloride, 1.76 ounces of calcium sulphate, .0176 ounce potassium bromate, 1.4 ounces flour, a compound selected from the following group: calcium carbonate, magnesium carbonate, having the proportion range, by weight of from .1 percent to 2 percent of the aggregate weight of the aforementioned ingredients, excepting the flour.

2. A yeast concomitant fortified against acidic deterioration adapted to be used in the making of leavened bread comprising in admixture the following ingredients in approximately the following proportions: .64 ounce ammonium chloride, 1.76 ounces calcium sulphate, .0176 ounce potassium bromate, a compound selected from the following group: calcium carbonate, magnesium carbonate, having the proportion range by weight of from .1 percent to 2 percent of the aggregate weight of the aforementioned ingredients, and a proportion of flour substantially less than 2.8 ounces.

HELMAN ROSENTHAL.